3,850,966
Patented Nov. 26, 1974

3,850,966
2-METHYL-3-METHYLSULFONYL CHROMONES

Marvin P. Cohen, New Milford, Max von Strandtmann, Rockaway Township, and John Shavel, Jr., Mendham, N.J., assignors to Warner-Lambert Company, Morris Plains, N.J.
No Drawing. Filed May 14, 1973, Ser. No. 359,813
Int. Cl. C07d 7/34
U.S. Cl. 260—345.2                 11 Claims

ABSTRACT OF THE DISCLOSURE

Chromones of the formula are disclosed:

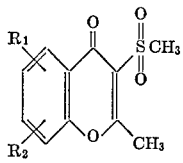

In the above formula $R_1$ and $R_2$ represent hydrogen, lower alkyl, lower alkoxy, aryl, and halogen, or $R_1$ and $R_2$ taken together with the benzene ring may form an additional aromatic or heteroaromatic nucleus. These compounds are useful as antisecretory agents.

---

The present invention relates to novel chromones and more particularly the present invention relates to chromones of the formula:

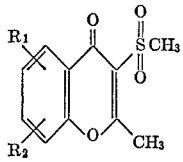

In the above formula $R_1$ and $R_2$ represent hydrogen, lower alkyl, lower alkoxy, aryl, and halogen, or $R_1$ and $R_2$ taken together with the benzene ring may form an additional aromatic or heteroaromatic nucleus.

In the above definitions for $R_1$ and $R_2$ the term "lower alkyl" and the "alkyl" portion of "alkoxy" is meant to have 1 to 6 carbon atoms. These are, for example, methyl, ethyl, propyl, isopropyl, butyl, isobutyl and the like. The term "aryl" denotes an aromatic hydrocarbon having 6 to 10 carbon atoms such as phenyl or tolyl. The term "halogen" encompasses fluorine, bromine, chlorine and iodine. The additional aromatic or heteroaromatic nucleus denotes nuclei such as naphthalene, isoquinoline, quinoline and the like.

The compounds of this invention are useful as gastric antisecretory agents. Thus, as the dose level of about 20 mg./kg. intraperitoneally they cause a 40–50% decrease in the volume of gastric acid in the rat, when tested according to the method described by Shay et al. in *Gastroenterology* 5, 43 (1945) and Winter et al. in *Proc. Soc. Exper. Biol. and Med.*, 111, 544 (1960).

These compounds are indicated in the management of gastric hyperacidity states such as gastric ulcer in mammals. In human beings, for example, a dose of 20 mg./kg. orally or by injection 2 or 3 times daily is recommended. This dose regimen can be varied depending on the severity of the condition, age, sex and weight of the patient being treated by methods known to the healing arts.

In order to use these compounds they are combined with excipients such as lactose, and formulated into dosage forms such as tablets by known pharmaceutical technology. They are also formulated into dosage forms with excipients such as "Water for Injection" suitable for parenteral administration.

According to the present invention compounds of Type I are prepared from compounds of Type II by the Kostanecki type reaction according to the following sequence:

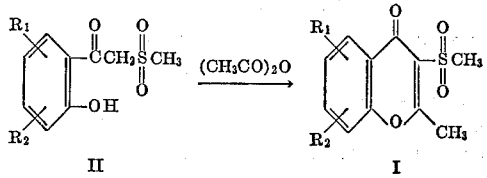

The starting materials II are prepared as described in our copending patent application Ser. No. 359,823, entitled 2-Hydroxy-2-(Methylsulfonyl)-Acetophenone Acetates filed on May 14, 1973.

Generally speaking, the reaction is effected by refluxing together the reactant and acetic anhydride. The product is recovered by conventional means.

The following examples are included in order further to illustrate the invention. Temperature referred to therein is given in centigrade.

EXAMPLE 1

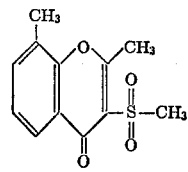

2,8-Dimethyl-3-(methylsulfonyl)chromone

A mixture of 8 g. of 2'-hydroxy-3'-methyl-2-(methylsulfonyl)acetophenone and 40 ml. of acetic anhydride was refluxed for 3 hours and the solution was poured onto 800 ml. of ice water with stirring. After 1 hour stirring, the precipitate was filtered off, washed with cold water, and recrystallized from absolute ethanol; m.p. 189°–191°; yield 7 g. (74%).

Anal. Calcd. for $C_{12}H_{12}O_4S$:
Calcd.: C—57.13, H—4.79, S—12.71
Found: C—57.32, H—4.75, S—12.61

EXAMPLE 2

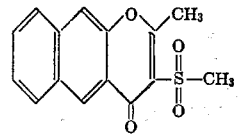

3-Methyl-3-(methylsulfonyl)-4H-naphtho[2,3-b]pyran-4-one

A mixture of 10 g. of 3'-hydroxy-2-(methylsulfonyl)-2'-acetonaphthone, 50 ml. of acetic anhydride and 0.5 ml. of pyridine was refluxed for 3 hours. The solution was poured into 800 ml. of ice water and the mixture was stirred for 1 hour. The precipitate was filtered off, washed with cold water and recrystallized from $CH_3CN$; m.p. 240°–242°; yield 3.5 g. (32%).

Anal. Calcd. for $C_{15}H_{12}O_4S$:
Calcd: C—62.49, H—4.20, S—11.12
Found: C—62.20, H—4.20, S—11.17

EXAMPLE 3

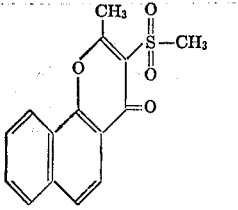

2-Methyl-3-(methylsulfonyl)-4H-naphtho[1,2-b]pyran-4-one

A mixture of 10 g. of 1'-hydroxy-2-(methylsulfonyl)-2'-acetonaphthone, 50 ml. of acetic anhydride and 0.5 ml. of pyridine was refluxed for 3 hours. The solution was poured onto 800 ml. of ice water, and the mixture was stirred for 1 hour. The precipitate was filtered off, washed with cold water, and recrystallized from $CH_3CN$; m.p. 206°–207°; yield 9.5 g. (86%).

Anal. Calcd: for $C_{15}H_{12}O_4S$:
Calcd: C—62.49, H—4.20, S—11.12
Found: C—62.30, H—4.37, S—11.15

EXAMPLE 4

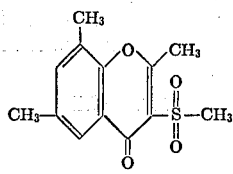

2,6,8-Trimethyl-3-(methylsulfonyl)chromone

A mixture of 10 g. of 2'-hydroxy-3',5'-dimethyl-2-(methylsulfonyl)acetophenone, 50 ml. of acetic anhydride and 0.5 ml. of pyridine was refluxed for 3 hours. The solution was poured into 800 ml. of ice water and stirred for 1 hour. The precipitate was filtered off, washed with water, and recrystallized from absolute ethanol; m.p. 149.5°–152°; yield 8.5 g. (78%).

Anal. Calcd. for $C_{13}H_{14}O_4S$:
Calcd: C—58.63, H—5.30, S—12.04.
Found: C—58.37, H—5.25, S—11.90

EXAMPLE 5

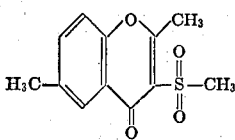

2,6-Dimethyl-3-(methylsulfonyl)chromone

A mixture of 10 g. of 2'-hydroxy-5'-methyl-2-(methylsulfonyl)acetophenone, 50 ml. of acetic anhydride and 0.5 ml. of pyridine was refluxed for 3 hours. The solution was poured into 800 ml. of ice water and the mixture was stirred for 1 hour. The precipitate was filtered off, washed with cold water and recrystallized from absolute ethanol; m.p. 135°–136°; yield 8 g. (72%).

Anal. Calcd. for $C_{12}H_{12}O_4S$:
Calcd: C—57.13, H—4.79, S—12.71
Found: C—56.83, H—4.77, S—12.84

EXAMPLE 6

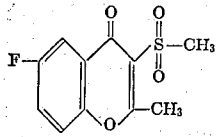

6-Fluoro-2-methyl-3-(methylsulfonyl)chromone

A mixture of 10 g. of 5'-fluoro-2'-hydroxy-2-(methylsulfonyl)acetophenone, 50 ml. of acetic anhydride and 0.5 ml. of pyridine was refluxed for 3 hours. The solution was poured into 800 ml. of ice water, and the mixture was stirred for 1 hour. The precipitate was filtered off, washed with cold water, and recrystallized from absolute ethanol; m.p. 149°–151°; yield 9.5 g. (87%).

Anal. Calcd. for $C_{11}H_9FO_4S$:
Calcd: C—51.56, H—3.54
Found: C—51.56, H—3.66

EXAMPLE 7

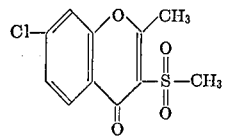

7-Chloro-2-methyl-3-(methylsulfonyl)chromone

A mixture of 10 g. of 4'-chloro-2'-hydroxy-2-(methylsulfonyl)acetophenone and 50 ml. of acetic anhydride was refluxed for 3 hours and poured into 800 ml. of ice water. The mixture was stirred for 1 hour and the precipitate was filtered off, washed with cold water, and recrystallized from $CH_3CN$; m.p. 214°–217°; yield 5 g. (43%).

Anal. calcd. for $C_{11}H_9ClO_4S$:
Calcd: C—48.45, H—3.33, S—11.76
Found: C—48.41, H—3.43, S—11.86

EXAMPLE 8

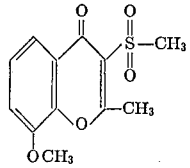

8-Methoxy-2-methyl-3-(methylsulfonyl)chromone

To a mixture of 10 g. of 2'-hydroxy-3'-methoxy-2-(methylsulfonyl)acetophenone and 50 ml. of acetic anhydride, was added a few drops of pyridine, and the mixture was refluxed for 3 hours. The solution was poured into 800 ml. of ice water and the mixture was stirred for 1 hour. The precipitate was filtered off, and recrystallized from $CH_3CN$; m.p. 199.5°–201.5°; yield 7 g. (73%).

Anal. Calcd. for $C_{12}H_{12}O_5S$:
Calcd: C—53.72, H—4.51, S—11.95
Found: C—53.70, H—4.70, S—11.92

EXAMPLE 9

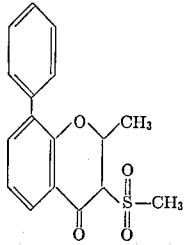

2-Methyl-3-(methylsulfonyl)-8-phenylchromone

A mixture of 10 g. of 2'-hydroxy-2-(methylsulfonyl)-3'-phenyl acetonaphthone and 50 ml. of acetic anhydride was treated with a few drops of pyridine, and the mixture was refluxed for 3 hours. The solution was poured into 800 ml. of ice water and stirred for 1 hour. The precipitate was filtered off, and recrystallized from $CH_3CN$; m.p. 197.5°–199.5°; yield 6 g. (55%).

Anal. Calcd. for $C_{17}H_{14}O_4S$:
Calcd: C—64.95, H—4.49, S—10.20
Found: C—64.71, H—4.61, S—10.10

EXAMPLE 10

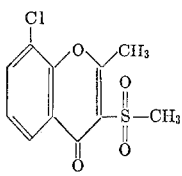

8-Chloro-2-methyl-3-(methylsulfonyl)chromone

A mixture of 10 g. of 3'-chloro-2'-hydroxy-2-(methylsulfonyl)acetophenone and 50 ml. of acetic anhydride was refluxed for 3 hours and the solution was poured into 800 ml. of ice water, and stirred for 1 hour. The precipitate was filtered off, washed with cold water and recrystallized from absolute ethanol; m.p. 163.5°–165.5°; yield 10.5 g. (97%).

Anal. Calcd. for $C_{11}H_9ClSO_4$:

Calcd.: C—48.45, H—3.33, S—11.76
Found: C—48.62, H—3.28, S—11.88

We claim:
1. A compound of the formula:

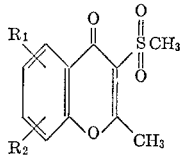

wherein $R_1$ and $R_2$ are hydrogen, lower alkyl having 1 to 6 carbon atoms, lower alkoxy having 1 to 6 carbon atoms, carbocyclic aryl having 6 to 10 carbon atoms, halogen or $R_1$ and $R_2$ taken together with the benzene ring forming naphthalene.

2. A compound according to claim 1 which is 2,8-dimethyl-3-(methylsulfonyl)chromone.
3. A compound according to claim 1 which is 2-methyl-3-(methylsulfonyl)-4H-naphtho[2,3-b]pyran-4-one.
4. A compound according to claim 1 which is 2-methyl-3-(methylsulfonyl) - 4H - naphtho[1,2-b]pyran-4-one.
5. A compound according to claim 1 which is 2,6,8-trimethyl-3-(methylsulfonyl)chromone.
6. A compound according to claim 1 which is 2,6-dimethyl-3-(methylsulfonyl)chromone.
7. A compound according to claim 1 which is 6-fluoro-2-methyl-3-(methylsulfonyl)chromone.
8. A compound according to claim 1 which is 7-chloro-2-methyl-3-(methylsulfonyl)chromone.
9. A compound according to claim 1 which is 8-methoxy-2-methyl-3-(methylsulfonyl)chromone.
10. A compound according to claim 1 which is 2-methyl-3-(methylsulfonyl)-8-phenylchromone.
11. A compound according to claim 1 which is 8-chloro-2-methyl-3-(methylsulfonyl)chromone.

References Cited
UNITED STATES PATENTS
3,699,128   10/1972   Von Strandtmann et al.
260—345.2

JOHN M. FORD, Primary Examiner

U.S. Cl. X.R.
424—283